Dec. 24, 1957    W. H. HARRIS ET AL    2,817,135
PANEL FASTENERS
Filed July 8, 1954
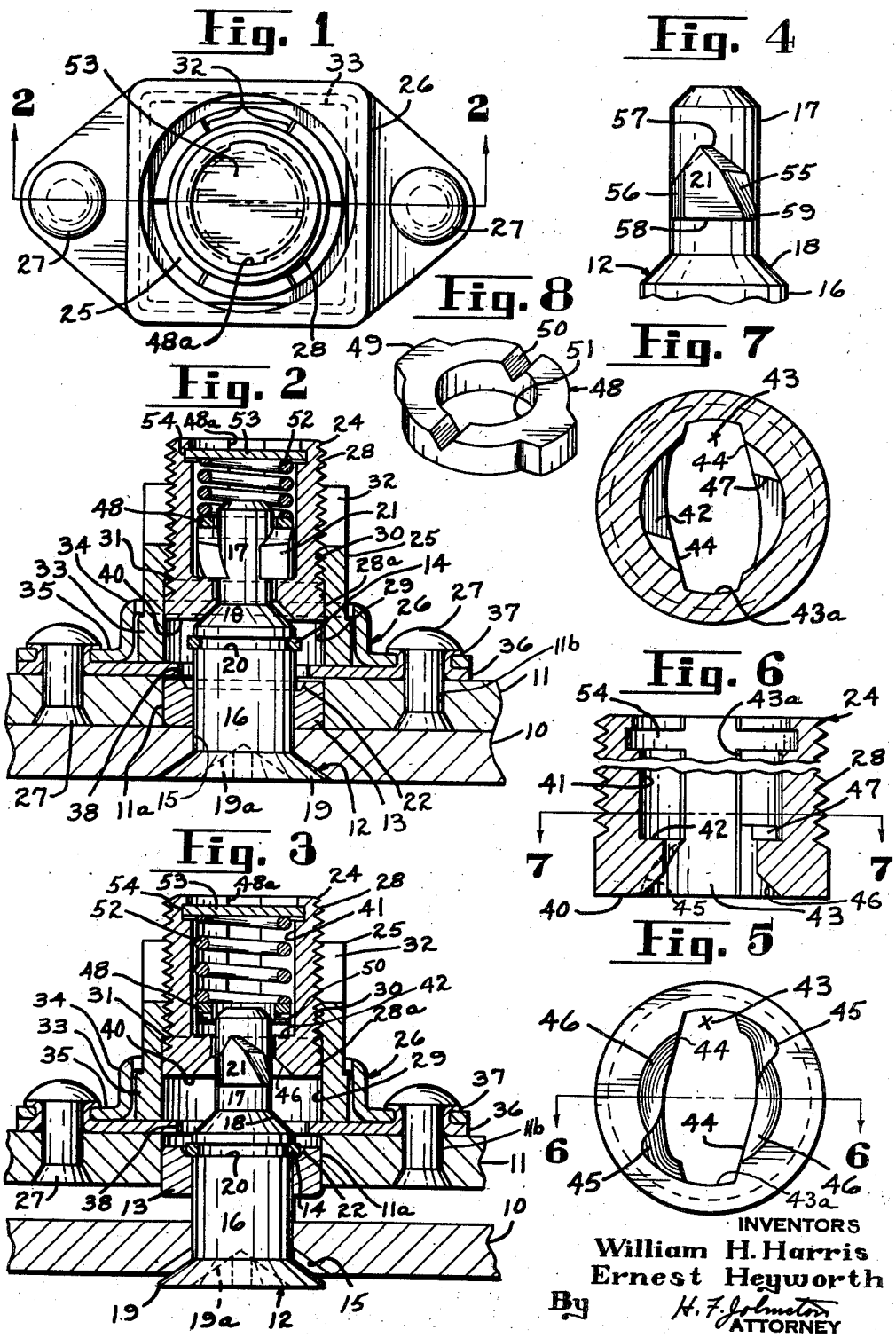
INVENTORS
William H. Harris
Ernest Heyworth
By H. F. Johnston
ATTORNEY

2,817,135

PANEL FASTENERS

William H. Harris, Litchfield, and Ernest Heyworth, New Haven, Conn., assignors to Scovill Manufacturing Company, Waterbury, Conn., a corporation of Connecticut Application July 8, 1954, Serial No. 442,154

8 Claims. (Cl. 24—221)

This invention relates to fasteners which are unyielding as in the case of a common bolt and nut and at the same time which can be quickly connected or disconnected.

Rotary operative and quick releasable panel or cowl fasteners are in common use in airplanes for holding in place various parts of the cowl inspection covers, and other similar structures. Such fasteners in general have a socket member attached to a support or inner plate and a stud member attached to an outer panel or plate, and wherein the stud member has a quick attachable and releasable engagement with the socket member by a turning action of relatively few degrees. These fasteners are generally of the spring loaded or yielding type and have been found to be unsatisfactory in modern high speed aircraft because they will allow lateral movement between the plates and also partial separation of the sheets which they are intended to hold together.

The general object of our invention is to solve the above and to make a fastener which is capable of carrying primary structural loads and other problems which are encountered in fasteners of this type.

When the hole in the inner plate is substantially larger than the stud diameter, a fastener is weak in shear because under a shear load the stud tends to angle over to one side or the other. The problem is solved in our construction by the use of a shear washer fitted about the stud and filling the plate hole.

Another problem comes about because of varying thicknesses of sheets or plates, or because the plates are somewhat separated due to going around curves, or other reasons, so that some provision must be made for adjustability between the stud and female fastening members. This is accomplished in older type fasteners by a spring action in at least one of the parts and by the use of a wide variety of stud lengths which necessitates carrying a large inventory.

According to our invention the female portion of the fastener includes a hollow screw threaded socket having internal means with which the stud may be engaged or disengaged by a quarter turn movement. This screw socket is threaded into a nut housing which is carried by the inner plate, preferably in a manner to allow for some lateral floating movement.

The usual manner of engagement of a stud with a socket requires the lateral wings or pins on the stud to cam over projections on the socket member and to drop into adjacent recesses. In our improved construction the stud wings are engaged over flat surfaces of the socket, and novel means is provided above the wings to prevent unintended turning of the stud in the socket, which novel means also serves to eject the stud from the socket when the stud is turned to unfastened position.

Another problem encountered with fasteners of this type is the retention of the stud member in the outer plate when the plates are separated, especially when the plates are handled in a careless manner, as by being walked upon or run over by shop jitneys. Our invention solves this problem by employing a shear washer which fits into a hole in the inner plate when the plates are assembled, and thus creates a greater bearing surface between the stud and inner plate, in combination with a locking ring fitted in a groove in the stud and which ring moves into a recess in said shear washer when there is any force applied to the stud tending to push it out through the outer plate. This shear washer is prevented from moving inwardly through the inner plate by means of an overhanging part of the base plate of the female fastener part, which base plate also serves as a limiting factor to limit the outward threading movement of the screw socket relative to its housing.

In our improved fastener, if the sheets are slightly separated, the stud member may be engaged with the screw socket to back off the screw socket to the point where the stud may enter to its proper position. Thereafter the stud can be turned to the right to interengage the stud and socket. After the first quarter turn the wings or projections on the stud engage stops in the screw socket to transmit turning movement to the screw socket so as to pull the plates tightly together. This combination assures a wide range of adjustments for the socket relative to the nut housing with any one stud length, thus simplifying the inventory problem.

If the stud is not projected sufficiently into the socket and it is attempted to turn the stud to the right, our invention provides another important feature which serves to cam the stud outwardly and visibly indicates to the mechanic that the stud is not properly engaged.

With these and other objects in view, the invention will be readily understood from the following detailed description of one preferred embodiment shown in the accompanying drawing wherein:

Fig. 1 is a plan view of the female member embodying our invention.

Fig. 2 is a vertical sectional view of the assembled female and stud members, the view taken along the line 2—2 of Fig. 1.

Fig. 3 is a similar view showing the stud as it appears lined up for assembly into the adjustable part of the female member.

Fig. 4 is a side elevation of the winged portion of the stud member.

Fig. 5 is an end view of the entrance end of the adjustable socket.

Fig. 6 is a fragmentary vertical sectional view through said socket taken along the line 6—6 of Fig. 5.

Fig. 7 is a transverse sectional view of said socket taken along the line 7—7 of Fig. 6, and Fig. 8 is a perspective view of the locking disc.

In considering now the details of construction, the fastener is adapted to rigidly clamp a removable outer plate or panel 10 to an inner support plate 11. The latter carries the female unit of the fastener, and the outer plate carries the stud unit. The stud unit consists of a stud 12, a shear washer 13 and a retaining split ring 14, the stud unit being rotatably mounted in an opening 15 in outer plate 10. The stud 12 itself is formed with a double diameter shank, the large portion 16 and the small portion 17 with a connecting conical shoulder 18 therebetween. One end of the large portion 16 is provided with a flat head 19 formed with a tool-engaging recess 19a that preferably is of the type used in the "Phillips head screws" of well known construction. The plate opening 15 is shaped to rotatably receive the large portion 16 of the stud shank and flat head 19 so that said head will lie flush with the outer surface of said plate 10. A circumferential recess 20 in the larger shank portion 16 of the stud 12 is adapted to receive the split ring 14 for holding the shear washer 13 in assembled position on said stud and in turn holding the stud in the outer plate 10, said washer having a slidable fit on said larger shank portion 16. A pair of lateral wings or projections 21 extend diametrically outwardly from the smaller shank portion 17, said wings having compound angular surfaces or slopes that will be more fully described later.

The shear washer 13 is formed with an annular recess 22 in its upper surface of a size to receive the retaining split ring 14. It will be apparent from this construction that any attempt to force the stud outwardly from its assembled position in the plate 10 will cause the split ring 14 to be confined within the washer recess 22 with no possibility of it being sprung outwardly or dislodged from its shank recess 20.

The socket assembly consists of a hollow screw socket 24, a nut housing 25 and a retainer housing 26 secured to the inner plate 11 as by a pair of rivets 27. The screw socket 24 has its exterior surface formed with a screw thread 28 substantially its entire length except for a short cylindrical section 28a at its inner end.

The nut housing 25 is provided with a cylindrical chamber 29 at its inner or base end and a tapped thread 30 at its outer end with a connecting shoulder 31 therebetween. The short cylindrical section 28a of the socket 24 is adapted to abut against the nut housing shoulder 31 to limit the outward adjustment of said socket. The upper end of the nut housing 25 is cut with a series of circumferentially spaced slots 32 to provide sectors that are biased slightly inwardly, thus creating a frictional binding action with the screw socket 24 to hold the latter securely in any adjusted position.

The nut housing 25 is mounted upon the inner plate 11 to allow some amount of floating action for the purpose of allowing the socket assembly axis to be brought into alignment with the opening 11a in the inner plate 11 and the stud axis. For this purpose the inner end of the housing 25 is formed with an integral squared base 33 loosely fitted into a complementary shell chamber 34 formed upwardly from a housing plate 35. The squared nut base 33 is held within the chamber 34 by a base plate 36 that is permanently secured to the housing plate 35. One method of securing the plates 35 and 36 together is to form a pair of extruded rivet collars 37 out of the base plate 36, which collars are projected through suitable piercings in the housing plate 35 and then upset against the upper surface, the rivet collars serving as openings to receive the attaching rivets 27. The base plate 36 is provided with an opening 38 through which the stud 12 projects to engage te socket 24. The size of the opening 38 is smaller than the nut chamber 29 and also the inner plate opening 11a and therefore serves to limit the outward movement of the socket 24, and when the socket assembly is attached to the plate 11 the base plate 26 confines the shear washer 13 within the plate opening 11a.

The screw socket 24 has a base or closed end 40 and an interior chamber 41. The closed end 40 provides an inner flat surface 42 normal to the axis of the socket over which the stud wings 21 ride when the stud is assembled to the socket 24. The base end 40 is provided with an elongated opening 43 having converging side walls 44, the opening being of sufficient size to permit the wings 31 of the stud member to pass freely therethrough. It is to be noted from Figs. 5 and 6 that the opposite ends of the opening 43 extend not only through the base end 40 but continue the entire length of the walls of the chamber 41 to provide channels 43a therein. Two of the diametrically opposite converging side walls 44 are formed with ejector cam surfaces 45, and the outer face of the base end 40 is formed with a conical recess 46 intercepting the cam surfaces 45 and the side walls 44. A pair of abutment stops 47 are formed upwardly from the flat surface 42 into the socket chamber 41 for limiting the turning movement of the stud relative to the socket and also serving as the means to adjust the threaded socket to the desired position.

In order to hold the stud 12 against reverse turning after it is assembled to the screw socket 24, a locking disc 48 is provided having opposite lugs 49 for slidable engagement in the channels 43a of the socket 24 and serving to hold the disc 48 against relative turning in the socket. A pair of diametrically opposite V-shaped grooves 50 are formed in the underside of the disc 48, the disc 48 also having a central opening 51 for receiving the nose end of the small stud shank 17 as seen in Fig. 2. The locking disc 48 is normally urged downwardly to rest against the abutment stops 47 by a coil compression spring 52 having one end resting against said disc while its opposite upper end seats against a closure disc 53. This closure disc serves to close off the open end of socket 24 and is fitted into an annular groove 54 formed in the chamber 41 adjacent the upper end of said socket.

Considering now the specific shape of the stud wings 31, each wing is formed with a lead-in surface 55 inclined substantially 30° to the vertical plane and an opposite backing-off surface 56 substantially parallel to the stud axis. The upper end 57 of the wing surfaces 55 and 56 is a wedge-shaped apex whose sides are at approximately right angles to each other. The underside of each wing 21 is formed as a flat base 58 normal to the axis of the stud, and the line of connection between the flat base 58 and leading-in surface 55 may be considered the abutment nose 59. It is to be noted that the distance between the stud conical shoulder 18 and the flat base 58 of the stud wings 21 is such that when the stud is inserted into the socket its fullest distance, i. e., to a position wherein the stud conical shoulder 18 will abut the socket conical recess 46, the stud wings 21 will not over pass the abutment stops 47 on the socket base flat surface 42 during relative turning of said stud to said socket.

In making the assembly of the outer plate 10 to the inner plate 11, the plate 10 will initially be positioned so that the studs 12 carried thereby will line up substantially with the inner plate openings 11a and base plate openings 38 and have their associated shear washers 13 assembled into said support plate openings 11a. The stud may then be manipulated by a suitable tool to register the stud wings 21 with the elongated opening 43 in the socket base 40. If perchance the stud wings 21 are not aligned with the socket opening 43, the apexes 57 of said wings will consequently lodge in the conical recesses 46, and inward pressure on the stud will cause the wings to glide from the conical recesses 46 to the ejector cam surfaces 45 and automatically rotate the stud in a counterclockwise direction in bringing the stud wings 21 into proper alignment with the opening 43. The stud may then be forced inwardly its fullest extent against the influence of the compression spring 52. The spring 52 will be compressed by reason of the stud wings 21 engaging the locking disc 48 and forcing it upwardly within the socket chamber 41. After the wing flat bases 58 are brought to a common plane with the socket flat surface 42, the stud is turned in a clockwise direction until the nose ends 59 of the wings 21 contact the abutment stops 47. In this position the apexes 57 of the wings will be aligned with the grooves 50 in the locking disc 48 whereupon the latter will be forced downwardly by the spring 52 interlocking the stud wings to said disc to prevent relative turning of the stud member in the socket member under normal conditions.

If the fit between the outer plate 10 and inner plate 11 is not tight enough, adjustment may be made by a continued turning of the stud after the nose end 59 of the stud wings 11 abut the stops 47 which will rotate the screw socket 24 against the frictional binding effect of the nut housing 25 and increase its axial distance from the inner plate 10.

The stud may be removed by turning it a quarter turn in a counterclockwise direction. During this operation the wing apexes 57 will cam out of the locking disc grooves 50 and to a position where the wings are aligned with the elongated opening 43 in the socket base 40, whereupon the spring 52 will automatically eject the stud member outwardly to approximately the position shown in Fig. 3. This will give visible indication to the operator that the stud connections are released, which is helpful particularly where there are numerous fasteners to be assembled or released.

If it becomes necessary to back-off the screw socket 24 relative to the nut housing 25, that is, to a position where the socket should be moved outwardly relative to the nut, this may be accomplished by inserting the stud into the socket to the position of Fig. 3 and turning it in a counterclockwise direction, whereupon the backing-off surfaces 56 of the wings 21 will abut the side walls 44 of the opening 43 and cause the socket to turn therewith.

If in the assembly of the stud into its respective socket the operator has failed to insert the stud far enough to have the wings 21 clear the base flat surface 42 and turn the stud in a clockwise direction, the stud will automatically be forced outwardly by reason of the lead-in surfaces 55 on the stud wings camming against the ejector cam surface 45 on the side walls of the socket opening 43. This action will forewarn the operator that the insertion of the stud is incomplete and that he will have to make a farther insertion of the stud into the socket to complete the assembly, and will also preclude the possibility of moving the socket 24 out of set position.

It will be apparent that the above described cowl fastener is one that is very sturdy in construction, that when the parts are all assembled together there is no chance for a lateral slipping of the outer plate relative to the inner plate, and one wherein the adjustment of the socket to accommodate varying conditions in the parts to be secured can be accomplished with the stud member itself without the need of any tools except a hand screwdriver, and in general is a fastener that will give no inconvenience when quick repairs or adjustments are to be made.

While the form of the invention herein shown and described embraces a preferred embodiment of the same, it is to be understood that the construction may be varied as to mechanical details without departing from the spirit of the invention and the scope of what is claimed.

What we claim is:

1. In a quick release rotary fastener for attaching an outer removable plate to an inner support plate, said fastener comprising a stud member rotatably carried by said outer plate and a female member carried by said inner plate, said female member including a nut housing attached to the inner face of the inner plate and a hollow socket threadedly engaged in said nut housing for adjustment relative thereto, said stud member having a double diameter shank with an intermediate conical shoulder, wing projections extending radially from the smaller diameter shank, said socket having an inner base end presenting flat inner shoulders normal to the socket axis with an opening therethrough shaped to permit the passage of said small stud shank and wing projections, abutment stops projecting inwardly from the flat inner surfaces of said shoulders in said socket engaged by said wing projections, and means on said socket base for engagement with said conical shoulder for limiting the inward axial movement of said stud into said socket to prevent said wing projections from passing beyond the range of said abutment stops.

2. In a quick release rotary fastener installation, in combination, an inner plate and outer removable plate, means for detachably connecting said plates together comprising a nut housing attached to the inner side of said inner plate, a hollow screw socket threadedly engaged in said nut housing and capable of being moved axially relative to said inner plate, a stud member rotatably mounted in said outer plate and having laterally projecting wings, said socket having a base end with an elongated opening therein to permit the passage of the winged portion of said stud therethrough, and cooperating means on the socket base end and stud wings for guiding the winged portions of said stud into said elongated opening.

3. In a quick release rotary fastener installation as defined in claim 2 wherein said guide means includes entrance concentric conical surface portions on each side of said elongated opening at the entrance to the base, one end of each conical surface portion merging with steeply inclined cam surfaces forming a part of the walls of said elongated opening, and said wing projections of the stud having cam engaging surfaces inclined in the same direction as said cam surfaces on the base end of the socket.

4. In a quick release rotary fastener installation, in combination, an inner plate and outer removable plate, means for detachably connecting said plates together comprising a nut housing attached to the inner side of said inner plate, a hollow screw socket threadedly engaged in said nut housing and capable of being moved axially relative to said inner plate, a stud member rotatably mounted in said outer plate and having laterally projecting wings, said socket having a base end with an elongated opening therein to permit the passage of the winged portion of said stud therethrough, and cooperating means between the socket base and the stud wings for imparting outward movement to said stud from said socket upon assembly turning movement if said stud is not inserted sufficiently to make interlocking engagement with said socket.

5. In a quick release rotary fastener installation as defined in claim 4 wherein said outward movement means to said stud includes diametrical opposite cam surfaces at the entrance to said elongated opening and complemental inclined surfaces on said stud wings arranged to urge said stud outwardly during such assembly rotary movement.

6. In a quick release rotary fastener installation for attaching inner and outer plates, said fastener comprising a stud member carried by said outer plate and a socket member carried by said inner plate, means removably holding said stud in assembled relation to said outer plate, said means consisting of a shear washer fitted about the shank of said stud and a split ring engaged in a recess in said stud shank, said inner plate having an opening for snugly receiving said shear washer, and a housing for attaching said socket to said inner plate, said housing including a base plate, said base plate having an opening aligned with and smaller than the opening in said inner plate and serving to confine said shear washer in said support opening.

7. In a quick release rotary fastener installation as defined in claim 6 wherein cooperating means is provided on the shear washer and the split ring to prevent accidental removal of the split ring out of its recess in the stud shank.

8. In a quick release rotary fastener installation as defined in claim 6 wherein the shear washer is provided with an annular recess to receive the split ring and prevent it from being forced out of its recess in the stud shank.

References Cited in the file of this patent

UNITED STATES PATENTS

| | | |
|---|---|---|
| 2,323,260 | Venditty | June 29, 1943 |
| 2,486,411 | Huelster | Nov. 1, 1949 |
| 2,567,069 | Harley | Sept. 4, 1951 |
| 2,571,641 | Wing | Oct. 16, 1951 |
| 2,684,516 | Zahodiakin | July 27, 1954 |
| 2,691,199 | Schlueter | Oct. 12, 1954 |